April 9, 1963     J. B. KUCERA     3,084,942
MATERIAL SPREADER

Filed April 11, 1960     2 Sheets-Sheet 1

INVENTOR
JOSEPH B. KUCERA

BY *Lowell & Henderson*

ATTORNEY

April 9, 1963  J. B. KUCERA  3,084,942
MATERIAL SPREADER
Filed April 11, 1960  2 Sheets-Sheet 2

INVENTOR
JOSEPH B. KUCERA

BY *Lawell & Henderson*

ATTORNEY 3,084,942
Patented Apr. 9, 1963

3,084,942
MATERIAL SPREADER
Joseph B. Kucera, Traer, Iowa, assignor of one-third to Rudolph L. Lowell, Des Moines, Iowa, and one-third to Eric M. McElhinney, Dysart, Iowa
Filed Apr. 11, 1960, Ser. No. 21,520
8 Claims. (Cl. 275—6)

This invention relates generally to material spreaders and more particularly to manure spreading equipment for attachment to the rear end of a farm wagon.

The primary object of this invention is to provide an improved spreader blade structure and mounting support therefor for manure spreading equipment.

A specific object of this invention is to provide an improved material spreading blade structure for a spreader assembly attached to the rear of a distributing farm wagon.

Another object of this invention is to provide an improved spreader blade structure for a spreading assembly attached to the rear end of a distributing farm wagon, wherein the blade structure is formed and mounted on the assembly so as to exert a combination beating and shearing action on the material during a spreading operation.

A still further object of this invention is to provide an improved blade structure for material spreaders, which includes a plurality of teeth at the material engaging edge of the blade whereby on rotation of the assembly a slicing or shearing action is exerted on the material being spread by each of the teeth of the blade.

A further object of this invention is to provide an improved spreader blade or beater for material spreading equipment whereby the blade, when utilized in plural form on the assembly, is mounted in such a manner as to engage the material in a shearing and impact relationship.

A still further object of this invention is to provide a material spreading assembly for attachment to the rear of a farm distributing wagon, which includes a plurality of spreader blades and structure to mount the spreader blades so that the planar surface thereof is angularly disposed to the plane of rotation of the spreader assembly.

Another object of this invention is to provide an improved flail assembly for material distributing wagons including a drive shaft and a plurality of spaced distributing blade or flail members mounted on the drive shaft in such a manner that the flails, upon rotation of the assembly, will enter into contact with the material being spread along an acute angle relative to the path of rotation of the assembly to effect thereby a combination impact and shearing or slicing action on the material so engaged.

Another object of this invention is to provide an improved spreader blade structure and mounting therefor in combination with a spreader assembly wherein the spreader blade is provided with a plurality of work engaging shearing teeth, and wherein the blade is provided with mounting means to arrange the blades about the assembly in an acute planar relationship to the plane of rotation of the assembly.

With the foregoing and other objects in view, the invention resides in the following specification and appended claims, certain embodiments and details of construction of which are illustrated in the accompanying drawings, in which:

Figure 1:
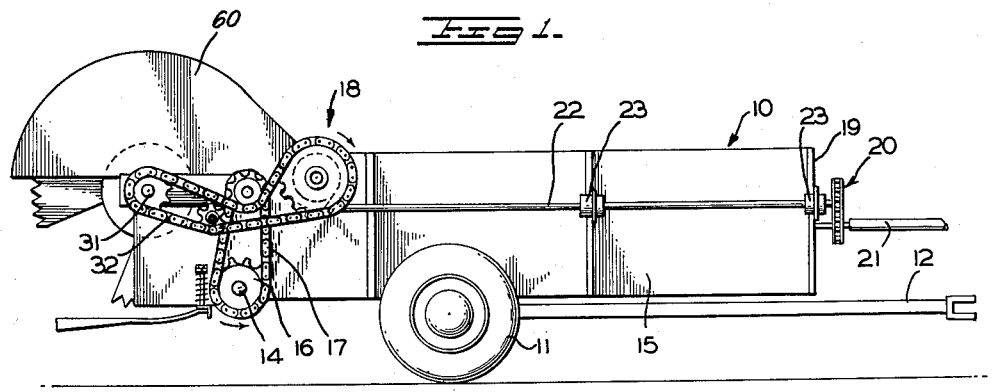
FIGURE 1 is a view in side elevation of a material distributing farm wagon to which the invention has been applied.

Referring more particularly to the drawings, in FIGURE 1 is illustrated a material spreading farm wagon 10, supported by wheels 11, and normally attached through means of a draw bar 12 to a traction vehicle (not shown).

Figure 2:
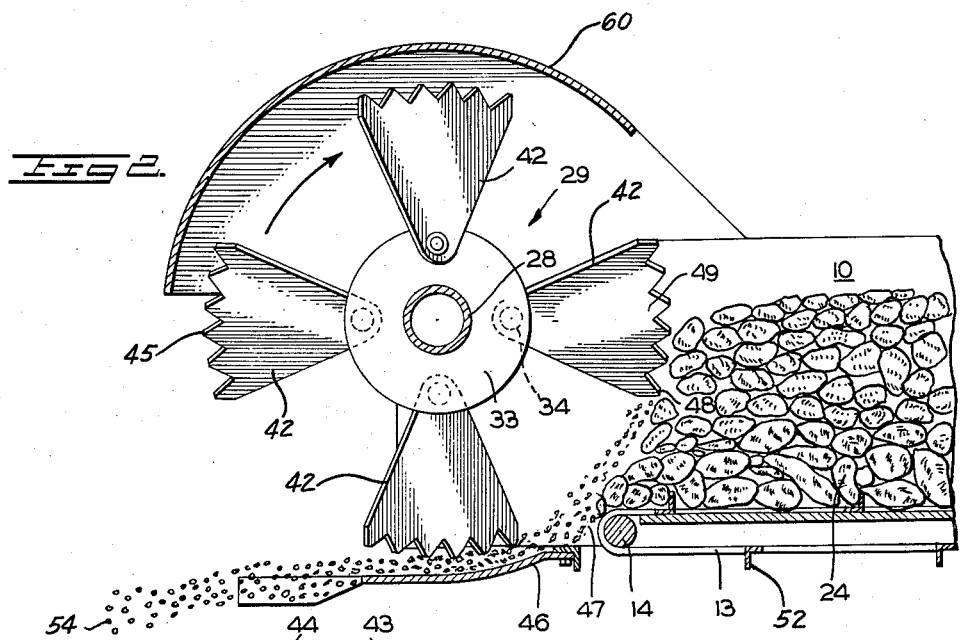
FIGURE 2 is an enlarged, partially sectioned, fragmentary detail view in side elevation of the spreader assembly section of the equipment illustrated in FIGURE 1.
Figure 3:
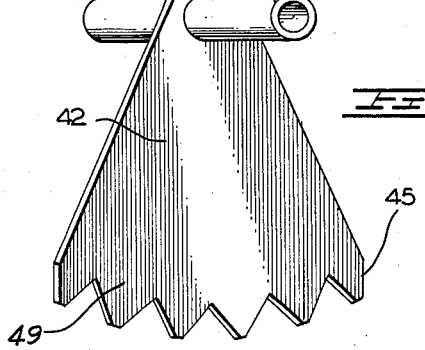
FIGURE 3 is a detail view in perspective of the improved spreader blade of this invention together with the mounting tubular bearing therefor.
Figure 4:
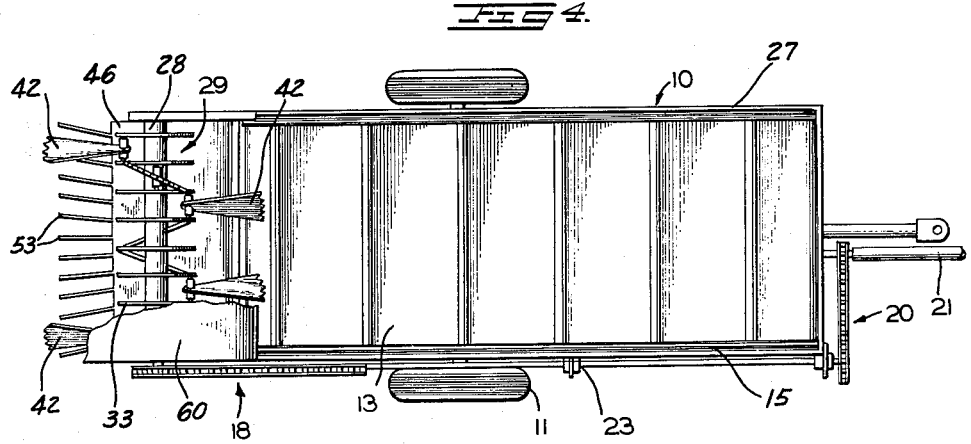
FIGURE 4 is a plan view of the equipment illustrated in FIGURE 1 with the spreader assembly hood partially cut away for illustrative purposes.

As is best illustrated in FIGURES 2 and 4, the wagon 10 is provided with a conveyor 13 running along the bottom thereof and driven by a shaft 14 which extends through the side wall 15 of wagon 10. Exteriorly of the wall 15 is a drive gear 16 (FIGURE 1) carried on the end of the shaft 14. A suitable gear reduction mechanism (not shown) may be interposed between the gear 16 and shaft 14, if desired. The gear 16 is meshed with a sprocket chain 17 forming a part of a drive assembly generally indicated at 18. On the forward end 19 of the wagon 10 is provided a drive assembly 20 which receives power from a drive shaft 21 actuated by the power takeoff of a traction vehicle (not illustrated). Actuation by the shaft 21 of the mechanism 20 imparts a rotary drive to a shaft 22 mounted by journal bearings 23 on the side of the wagon. The rotary movement imparted to the shaft 22 is transferred through the gearing assembly 18 to the sprocket drive 17, whereby, upon actuation, the conveyor 13 may be rotated so as to discharge material such as manure 24 rearwardly of the wagon 10.

Mounted by suitable bearings 25 and 26 in the side walls 27 and 15 respectively of the wagon 10 is a drive shaft 28 for the spreader assembly, generally indicated at 29 (FIGURE 5) and positioned below a hood or guard 60. The shaft or tubular member 28 has an extension 30 extending through the side wall 15 of the wagon terminating in a drive gear 31 (FIGURE 1) which is interengaged on the exterior wall of the wagon with a sprocket chain 32 forming a part of the drive gear assembly 18. It is obvious, therefore, that rotation of the shaft 22 through the assembly 18 will likewise impart rotation to the driving gear 31 and to the shaft 28 of the spreader assembly 29. The details of this drive mechanism have not been described in detail as they form no specific part of this invention.

Figure 5:
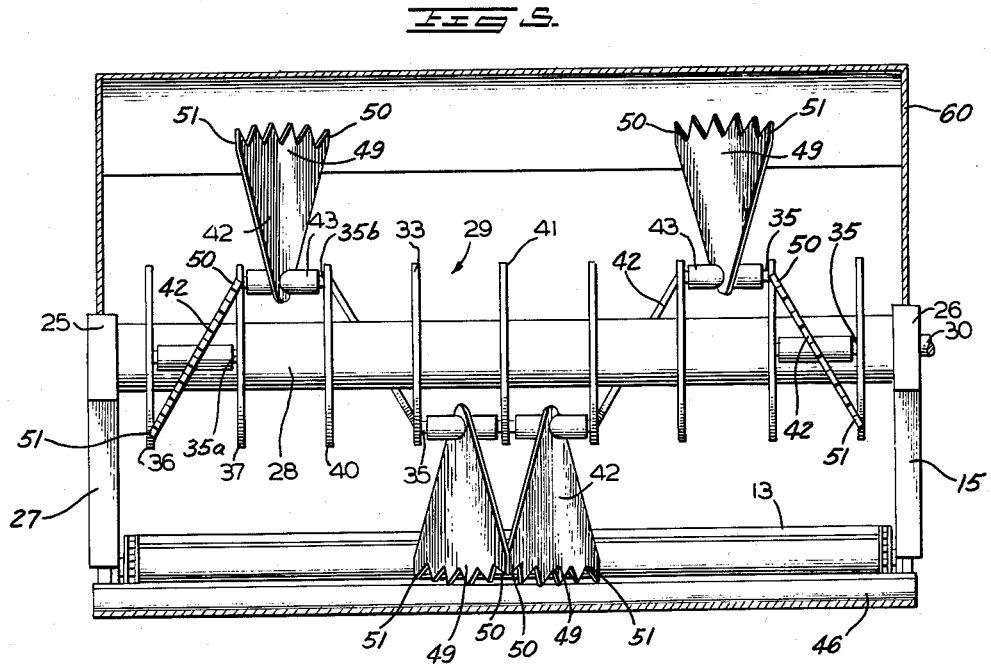
FIGURE 5 is a view taken looking toward the right in FIGURE 2 with portions shown in section for the purpose of clarity.

As is best illustrated in FIGURES 2 and 5, the spreader assembly 20 includes the tubular drive shaft 28 and a plurality of spaced mounting discs 33. The discs 33 are equally spaced from each other and are preferably welded to the exterior of the shaft 28. Each disc 33 is provided with a hole 34 adjacent to a peripheral edge. Each adjacent pair of plates is provided with aligned holes whereby to receive and fixedly mount a plurality of pivot pins 35. Now with particular regard to FIGURE 5, it will become obvious that the discs 36 and 37 are provided with a pivot pin 35a which is displaced angularly approximately 90 degrees relative to pivot pin 35b which is carried between the discs 37 and 40. As shown in FIGURE 5 between the discs 36 and 41 there are four such pivot pins 35 to which are rotatably or pivotally secured spreader blades or flails 42 with each pin being angularly disposed 90 degrees from an adjacent pin.

It is obvious that any number of such pivot pins may be provided with one such pivot pin being provided particularly between each pair of adjacent mounting discs.

The only limitation would be in the over-all width of the assembly. It is to be further noted that on either side of the center mounting disc 41, that the blades 42 are oppositely inclined relative to the plane of rotation of the drive shaft 28. About each pivot pin 35 is a tubular bearing member 43 which has an internal diameter slightly larger than the external diameter of the pin 35, whereby to freely carry the suspended spreader blade member 42. Each spreader blade is provided with an opening 44 which is angularly disposed through the material of the blade 42 so that mounting of the blade 42 on the tubular bearing member 43 will angularly dispose the planar surface of the blade 42 relative to the axis of rotation of the shaft 28 when the blades are placed in assembled relation in the assembly 29. The blades 42 are preferably, but not necessarily, welded to the tubular members 43 in order to maintain a fixed position between the mounting discs 33. During assembly, therefore, a tubular member carrying a spreader blade thereon is placed adjacent the aligned openings of adjacent discs 33 and 41. At this point a pivot pin 35 is inserted through the openings of the spaced brackets or discs and is retained by suitable means (not shown) to thereby rotatably mount a blade on a pivot pin 35.

Now with further reference to FIGURES 4 and 5 it will be noted that on opposite sides of disc 41 that the blades are oppositely inclined toward the center. The reason for so mounting the blades is quite obvious, and is not an innovation in the art. Upon engagement of the blade members 42 with the material 24 being delivered rearwardly of the wagon 10, a certain side thrust will be set up during such engagement which would cause possible damage to the equipment or shaking of the wagon body 10 itself. By oppositely mounting the blade members 42 an equalizing, or cancelling thrust, is created to thereby avoid the difficulties.

Each of the spreader blades is illustrated as being provided with integral teeth 45 along the base or working portion 49 of the triangularly configurated member. These teeth represent the preferred form but not necessarily the only form which this improved blade may take. For example, any cutting edge along the lower extremity or base section of the triangularly configurated blade 42 will exert a shearing action on the material being spread as distinguished from the beater action alone of the prior art.

It has been found that by using the plural spaced teeth 45 in combination with the angularly disposed planar area of the blade 42 that, during rotation, the teeth will engage the material 24 in such a manner as to exert a plurality of slightly spaced shearing actions on the material to thereby further disintegrate the same and more evenly spread the same rearwardly of a wagon. In other words, the prior art depended on impact alone to break up a clod of material being spread, whereas the present invention is concerned with both striking and shearing the material to provide a more even sizing of that material dispensed from the spreader assembly.

With reference to FIGURE 5 it will be seen that the working or base end 49 of a blade 42 is of a length and of an inclination to extend within the radially extended transverse confines of the mounting discs 33 and 41. In other words, the leading and trailing edges 50 and 51, respectively of a blade 42 are in an overlapping relation with the corresponding edges 51 and 50, respectively, of a next adjacent blade 42 so that there is no gap or space between adjacent blades 42 relative to the material 24 being acted upon. Stated otherwise, the working ends 49 of the blades 42, form a continuous working surface over the axial length of the spreader or flail assembly 29, in that the leading edge 50 of one blade 42 is in a peripheral following relation with the trailing edge 51 of the blade 42 which is being followed.

Now to review the operation of the invention, it will be particularly obvious from FIGURE 2 that material 24 will be conveyed by the conveyor 13 rearwardly of the wagon 10 and into the flail assembly 29. With the assembly 29 rotating in a clockwise direction as indicated by the arrow in FIGURE 2, the blades 42 are moved downwardly into the material 24, which is initially engaged by a leading edge 50 of a spreader blade 42. Each successive tooth 45 behind the leading edge 50 along the base or working surface 49 of a blade 42 will describe a path of rotation slightly offset from that of the previous tooth. In this manner a considerable amount of impact and shearing action will take place on the material 24 to thoroughly and uniformly disintegrate the material for spreading.

Also as shown in FIGURE 2 the base 49 of a blade 42, during rotation of the assembly 29, is moved in a small clearance relation with the cleats 52 on the conveyor 13. Thus with the blades 42 movable contiguous to the conveyor 13 substantially all of the material 24 delivered by the conveyor into the assembly 29 is acted upon, so as to eliminate the spilling of material directly to the ground from a position between the assembly 29 and the conveyor 13.

The material, as uniformly disintegrated from the combined impact and shear action of the blades 42 is moved by the impeller action of the assembly 29 onto an apron member 46 constituting a rearward extension of the wagon 10, and terminating at its rear end in upright horizontally diverged deflecting wings or plates 53. From the apron 46 the material 24, during discharge will be spread both longitudinally and slightly laterally of the vehicle 10 as a fine evenly distributed and evenly disintegrated material 54 compared with the clod material 24 carried by the wagon. It will be apparent that the apron 46 merely complements the spreading action of the blades 42, which by virtue of their angular disposition on the shaft 28 in the assembly 29, have planar surfaces that force the material rearwardly and laterally of the wagon 10.

Because of the pivotal swinging movement of the blades 42 on the shaft 28, the blades 42 on striking a foreign object such as a rock, lumber or the like inadvertently carried in the material 24, will bounce back. Damage to the assembly 29 is thus prevented while permitting passage of the object through the assembly 29 to the ground. However, because of the mass of a blade 42 and its resultant heavy impact action foreign objects in the material 24 are often disintegrated and discharged in pieces with the comminuted material 54. The mass of the blades 42, after the assembly 29 is in rotation, also provides for the impact and shearing action on the material 24 taking place with a reduced power demand from the tractor. It will also be apparent that the blades 42 are incapable of becoming wrapped or lodged about the shaft 28 so as to be always in position for operation.

Obvious modifications to the structural details of the spreader blade and mounting therefor comprising the invention described in this application and as set forth in the appended claims are deemed to be within the spirit and scope of such claims and the concepts of this application.

I claim:
1. A material spreading assembly for attachment to the rear of a material spreading vehicle having a conveyor means for moving material in the vehicle toward the rear end thereof, said assembly comprising rotatable shaft means extended transversely across the rear of said vehicle, said shaft rotatable downwardly on its side facing into said vehicle, a plurality of spaced spreader blades extended spirally about said shaft means with each pivotally connected at one end thereof to said shaft means, said spreader blades being angularly inclined relative to said shaft means and having working ends opposite said pivoted ends movable downwardly contiguous to the rear end of said conveyor means, with the blades over one-half the length of said shaft means being reversely inclined rel- ative to the blades over the other half of said shaft means, said working ends each having a leading edge and a trailing edge, each leading edge being in a peripheral following relation with the trailing edge of an adjacent spreader blade working end, whereby upon rotation of said shaft means, the working ends of said blades form a continuous working edge of spiral formation to exert a full line downward shearing action on the material to be spread concurrently with the inclination of said blades acting to spread the sheared material in a path having a width greater than the length of said shaft means.

2. A material spreading assembly including a rotatable shaft unit and a plurality of blade members, positioned in a row extended in a stepped relation circumferentially about said shaft unit, means pivotally connecting each of said blades at one end thereof to said shaft unit, with each blade over at least the half portion thereof remote from said one end having a planar surface terminating in a working edge, said planar surface being inclined relative to said shaft unit so as to constitute a leading face for a blade, with the blade members over one-half the length of said shaft having the planar surfaces thereof reversely inclined relative to the planar surfaces of the blade members over the other half of said shaft unit, and with said portion of each blade being of a greater weight than the remaining portion of the blade, whereby the working edge of each blade will exert a shearing and impact action on material during a spreading action and said planar surfaces will coact to spread the material in a path having a width greater than the length of said shaft unit.

3. The invention according to claim 2 wherein the adjacent ends of the working edges of adjacent blades are in an overlapped relation axially of said shaft unit so that said adjacent ends travel in the same peripheral path about said shaft unit whereby a continuous working edge is formed over the length of said shaft unit.

4. A one piece spreader blade for a rotatable spreader assembly including a shaft unit, means pivotally connecting one end of said blade adjacent the axis of said shaft unit for free swinging movement on said shaft unit, with the sides of said blade being in a diverged relation outwardly from said one end and said blade over at least the half portion thereof remote from said one end being formed with a planar surface terminating in a plurality of teeth having the tips thereof defining a convex arc the radial center of which arc is substantially coincident with the axis of said connecting means, said planar surface being inclined relative to said shaft unit to form a leading face for the blade, and said diverged relation of the blade sides providing for said portion of the blade being of a greater weight than the remaining portion of the blade whereby said teeth exert a like shearing and impact action on material during a spreading operation.

5. In a material spreader apparatus including a box having a bottom wall, side walls and an open end, endless conveyor means mounted on said box for movement longitudinally across said bottom wall to move material toward said open end, a material spreading assembly mounted on said box at the open end thereof and including a rotatable shaft means extended transversely of said box at a position upwardly from the end of said conveyor at the open end of the box, a plurality of spaced spreader blades carried by said shaft means substantially over the width of said box defined by said side walls, each blade being pivotally connected at one end thereof to said shaft means and over a portion thereof remote from said one end having a planar surface terminating in a working edge, means for rotating said spreading assembly in a direction to provide for the spreader blades moving downwardly into the material moved by said conveyor means, said spreader blades being of a length such that, on rotation of said assembly, said blades are radially extended with the working edges thereof movable adjacent said end of the conveyor means, and said planar surfaces being inclined relative to said shaft means so as to constitute leading faces for said blades, with the blades over one-half the length of said shaft means having the planar surfaces thereof reversely inclined relative to the planar surfaces of the blade members over the other half of said shaft means, whereby the working edge of each blade will exert an impact and shearing action downwardly on the material moved into said assembly by said conveyor means and said planar surfaces will coact to spread the material from under said spreading assembly outwardly from the open end of said box in a path having a width greater than the width of said box.

6. The invention according to claim 5 wherein the outer half portion of each blade is of a weight greater than the remaining half portion adjacent the end of the blade to increase the impact action of the blades on the material to be spread.

7. The invention according to claim 5 wherein a cover means is mounted on said box to deflect into said box any material thrown upwardly by that portion of the spreader assembly remote from said end of the conveyor.

8. In a material spreader apparatus including a box having a bottom wall, side walls, and an open end; endless conveyor means mounted on said box for movement longitudinally across said bottom wall to move material toward said open end; a material spreading assembly mounted on said box adjacent the open end thereof; said material spreading assembly comprising, a rotatable shaft means in said spreading assembly extending transversely of said box at a position upwardly from the end of said conveyor; a plurality of axially spaced rigid blade members positioned circumferentially about said shaft means with each of said blade members pivotally connected to said shaft means for swinging movement about the inner end of each said blade; with at least the outer half portion remote from said inner end of each of said blade members having a planar surface terminating in a working edge and said outer half portion of each blade being of a greater weight than the remaining portion of the blade; said planar surface and said working edge of each blade disposed at an angle relative to the rotation of said shaft with said planar surfaces of said blade members oppositely disposed on corresponding blade members positioned on opposite sides of the longitudinal center line of said shaft thereby to deflect material longitudinally of said spreading assembly; and means rotating said shaft means to swing the working edges and the planar surfaces of the said greater weight outer portions of said blade members downwardly into material moved by said conveyor into said spreading assembly; thereby to cause said blades to exert a shearing and impact action on material during a spreading action and said planar surfaces to coact to spread material under and rearwardly of the spreading assembly in a path having a width greater than the transverse length of said shaft means.

References Cited in the file of this patent

UNITED STATES PATENTS

| | | |
|---|---|---|
| 1,103,219 | Ogden | July 14, 1914 |
| 1,803,148 | Sheppard | Apr. 28, 1931 |
| 2,199,137 | Magnani | Apr. 30, 1940 |
| 2,240,720 | Selhorst | May 6, 1941 |
| 2,578,822 | Miner | Dec. 18, 1951 |
| 2,597,052 | Barker | May 20, 1952 |
| 2,704,670 | Vutz et al. | Mar. 22, 1955 |
| 2,841,946 | Skromme | July 8, 1958 |
| 2,885,209 | Bruecker | May 5, 1959 |
| 2,952,466 | Carlson | Sept. 13, 1960 |
| 2,958,530 | Kucera et al. | Nov. 1, 1960 |
| 3,025,067 | Raney et al. | Mar. 13, 1962 |

FOREIGN PATENTS

| | | |
|---|---|---|
| 139,682 | Austria | Dec. 10, 1934 |